US006647657B2

(12) United States Patent
Igo

(10) Patent No.: US 6,647,657 B2
(45) Date of Patent: Nov. 18, 2003

(54) ADJUSTABLE DUCK DECOY

(76) Inventor: Matthew C. Igo, 13377 W. Persimmon St., Boise, ID (US) 83713

( * ) Notice: Subject to any disclaimer, the term of this patent is extended or adjusted under 35 U.S.C. 154(b) by 0 days.

(21) Appl. No.: 10/100,836

(22) Filed: Mar. 15, 2002

(65) Prior Publication Data

US 2003/0172576 A1 Sep. 18, 2003

(51) Int. Cl.$^7$ ............................................. A01M 31/06
(52) U.S. Cl. ...................................................... 43/3
(58) Field of Search .......................................... 43/3, 2

(56) References Cited

U.S. PATENT DOCUMENTS

| | | | | |
|---|---|---|---|---|
| 235,845 A | * | 12/1880 | Appleton | 43/3 |
| 390,587 A | * | 10/1888 | Gammon | 43/3 |
| 747,732 A | * | 12/1903 | Kremer | 43/3 |
| 836,823 A | * | 11/1906 | Oliver et al. | 43/3 |
| 883,161 A | * | 3/1908 | Rosentreter | 43/3 |
| 1,110,245 A | * | 9/1914 | Vaughan | 43/3 |
| 1,392,065 A | * | 9/1921 | Klock | 43/3 |
| 1,409,285 A | * | 3/1922 | Dennett | 43/3 |
| 1,571,213 A | * | 2/1926 | Pitts | 43/3 |
| 1,571,711 A | * | 2/1926 | Dewey | 43/3 |
| 1,789,649 A | | 1/1931 | Gazecki et al. | 43/3 |
| 1,813,370 A | * | 7/1931 | Villatore et al. | 43/3 |
| 2,162,786 A | * | 6/1939 | Oeding | 43/3 |
| 2,185,013 A | * | 12/1939 | Bonetti | 43/3 |
| 2,268,963 A | * | 1/1942 | Riddell | 43/3 |
| 2,342,107 A | * | 2/1944 | Agius | 43/3 |
| 2,430,645 A | * | 11/1947 | Mills et al. | 43/3 |
| 2,746,195 A | * | 5/1956 | Renwick, Jr. | 43/3 |
| 3,000,128 A | * | 9/1961 | McAda | 43/3 |
| 3,074,195 A | * | 1/1963 | Vanderpool | 43/3 |
| 3,689,927 A | * | 9/1972 | Boston et al. | 43/3 |
| 3,758,975 A | * | 9/1973 | Curtis | 43/26.1 |
| 4,251,937 A | * | 2/1981 | Curley | 43/3 |
| D268,047 S | | 2/1983 | Fulster | D22/125 |
| D270,656 S | | 9/1983 | Fulster | D22/125 |
| 4,450,642 A | | 5/1984 | DeKezel et al. | 43/3 |
| 4,612,722 A | * | 9/1986 | Ferrell | 43/3 |
| 4,674,219 A | * | 6/1987 | Chargo et al. | 43/3 |
| 4,768,988 A | * | 9/1988 | Rutter | 43/3 |
| 4,827,653 A | * | 5/1989 | Sewell | 43/3 |
| 5,016,385 A | * | 5/1991 | Blease | 43/26.1 |
| 5,172,507 A | | 12/1992 | Franceshini | 43/3 |
| 5,377,439 A | * | 1/1995 | Roos et al. | 43/3 |
| 5,515,637 A | * | 5/1996 | Johnson | 43/2 |
| 5,902,163 A | | 5/1999 | Baruzzi et al. | 441/23 |
| 6,088,944 A | | 7/2000 | Jones | 43/3 |
| 6,339,895 B1 | * | 1/2002 | Lawson | 43/3 |
| 6,357,161 B1 | * | 3/2002 | Best | 43/3 |

* cited by examiner

*Primary Examiner*—Darren W. Ark
(74) *Attorney, Agent, or Firm*—Derek H. Maughan; Frank J. Dykas; Stephen M. Nipper

(57) ABSTRACT

A decoy for attracting waterfowl having an upper body portion, a non-parallely oriented keel and an anchor. The decoy body is non-parallely connected to a keel by an attachment means. This attachment means may be fixed or adjustable. This non-parallel orientation between the keel and the upper body allows the decoy to maintain a desired orientation within a body of water when acted upon by a wind or water current. An anchor connected to the combination of the decoy and the keel provides a means for maintaining the decoy in a generally fixed location. This combination of features allows the orientation of a group of decoys to be varied so as to provide a desired natural looking presentation.

3 Claims, 4 Drawing Sheets

ADJUSTABLE DUCK DECOY

BACKGROUND OF THE INVENTION

1. Field of the Invention

The present invention generally relates to duck and waterfowl decoys, and more particularly to a decoy having an adjustable keel for varying the orientation and profile of a decoy in a body of water.

2. Background Information

Waterfowl decoys have been used for many years in various applications to attract waterfowl to desired areas. Typically, the user will arrange a collection of decoys in a body of water such as a lake, pond or river for the purpose of attracting live birds to the area. It is the intent of the party using the decoys to mimic the presentation of a group of waterfowl in an area, thus inducing real waterfowl to the area.

Most decoys are comprised of an upper body portion and a lower body portion. The upper portion is shaped and designed to resemble the appearance of a duck, goose, swan or other waterfowl. A bottom portion provides a surface which displaces a quantity of water sufficient to allow the decoy to float. However, flat decoys can be overturned by a strong wind or by the movement of water in a current. This results in the presentation of the decoys wherein the upper body portion is below the water. This is not always a desired orientation or presentation of the decoys.

This problem has been overcome in some applications by the presence of a weighted keel. These keels are aligned with the head and tail of the decoy and are intended to maintain the decoys in a desired floating position, the upper portion of the decoy above the water and the lower portion of the decoy below the water. The attachment of most keels is directed such that when the decoys are placed in a body of water having a current, such as a stream or river, the keel aligns with the direction of the current. In situations where a current of wind is placed upon decoys in a body of water, the keel will align with the direction of the wind. In as much as most keels are aligned in a fixed orientation parallel with an axis formed by the head and tail of a decoy, decoys will align parallel with the direction of the wind or water current.

When a series of decoys are used to simulate a group of waterfowl, all of the waterfowl will align with the current, this results in a less natural and less effective appearance. In a natural habitat, live individual waterfowl often face in various directions with regard to wind or water currents as they take part in their daily activities. Most existing decoys having a fixed parallel keel cannot be placed in these varying directions. On the contrary, when placed in a body of water having a current or when exposed to wind, these decoys will align to form lines parallel to the direction of the current. This configuration appears unnatural and limits the ability of the decoy to attract birds flying overhead.

Accordingly, it is an object of the present invention to provide a duck decoy for use in a body of water having a current. Another object of the invention is to provide a decoy with a non parallel keel that allows for a more natural configuration and placement of decoys in a natural setting. A further object is to provide an adjustable keel for directing the orientation of a decoy object in a body of water.

SUMMARY OF THE INVENTION

These objects are achieved using a waterfowl decoy having a selectively adjustable keel. The decoy is made up of an upper portion, being shaped like a waterfowl, connected to a keel. The keel has a first end and a second end and is connected to the upper portion of the decoy through an attachment means. The attachment means may be adjustable or permanent, and orients the keel in a non-parallel direction with regard to the head and tail of the decoy. An anchor connected to the decoy provides a means for maintaining the decoy in a generally defined location.

When the decoy is placed in a body of water and acted upon by a wind or water current, the keel aligns within the current, and the body of the decoy is maintained in a desired orientation with regard to the orientation of the keel. The non-parallel orientation of the keel and the upper portion of the decoy allows the direction of the decoy to be varied so as to provide a desired natural looking arrangement of decoys. In a desired situation, a double keel may also be used to vary the height of the profile of the decoys in the water, or to give greater stability to the decoy in varying adverse weather or water conditions.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
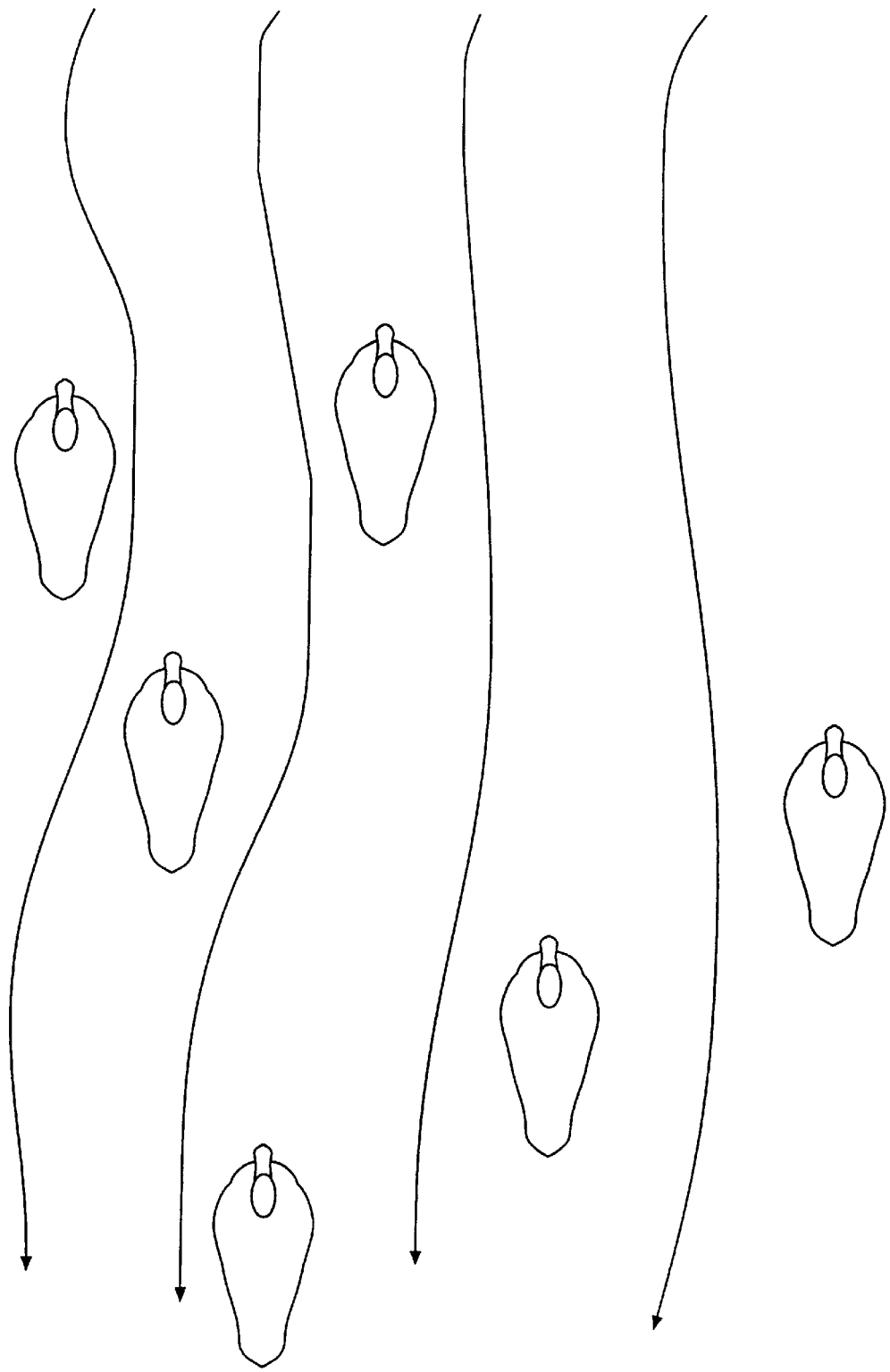
FIG. 1 is a top plan view of decoys in a prior art embodiment in use.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

This invention is a decoy, for use in attracting waterfowl. The decoy has a non-parallel keel that enables the decoy to have a more natural presentation, particularly when used in a body of water affected by a wind or water current. In a preferred embodiment of the invention this keel is adjustably oriented so as to allow placement of the decoy in a variety of positions with regard to the current.

In the prior art, decoys are used in various applications to attract waterfowl to desired areas. Typically, the user will arrange a collection of decoys in a body of water such as a lake, pond or river for the purpose of attracting live birds to the area. Most decoys either have no keel, which makes them susceptible to being overturned by a strong current or the wind, or a fixed parallel keel aligned with the head and tail of the decoy. These parallel decoys only allow the orientation of the head and tail of the decoys in a direction parallel with the current. When these decoys are placed in a body of water having a current, the decoys will align so that the heads of the decoys are positioned either into or away from the direction of the current. When a series of decoys are used to simulate a group of ducks, all of the ducks will align with the current resulting in a less natural and less effective appearance. A top view of this alignment of prior art decoys is shown in FIG. 1.

Figure 2:
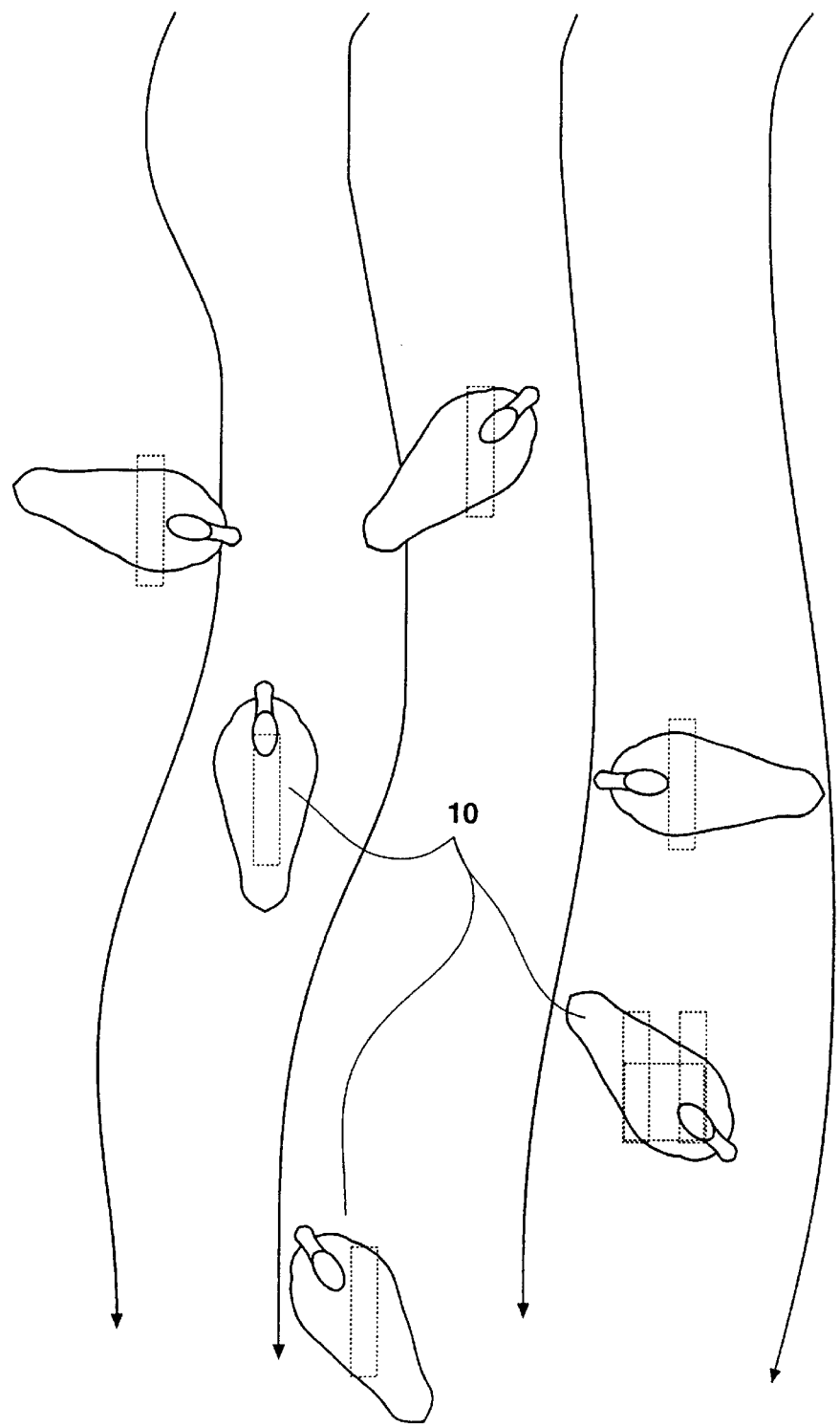
FIG. 2 is a top plan view of decoys from the present invention in use.

In a natural habitat, individual waterfowl are often facing in various directions including perpendicular to the stream or wind currents and between perpendicular and parallel to these currents. The present invention permits decoys to be arranged in a more natural pattern when placed in a body of water affected by a wind or water current. A top plan view of this arrangement of the decoys of the present invention 10 is shown in FIG. 2. This more natural orientation is achieved by the use of the present invention.

Figure 3:
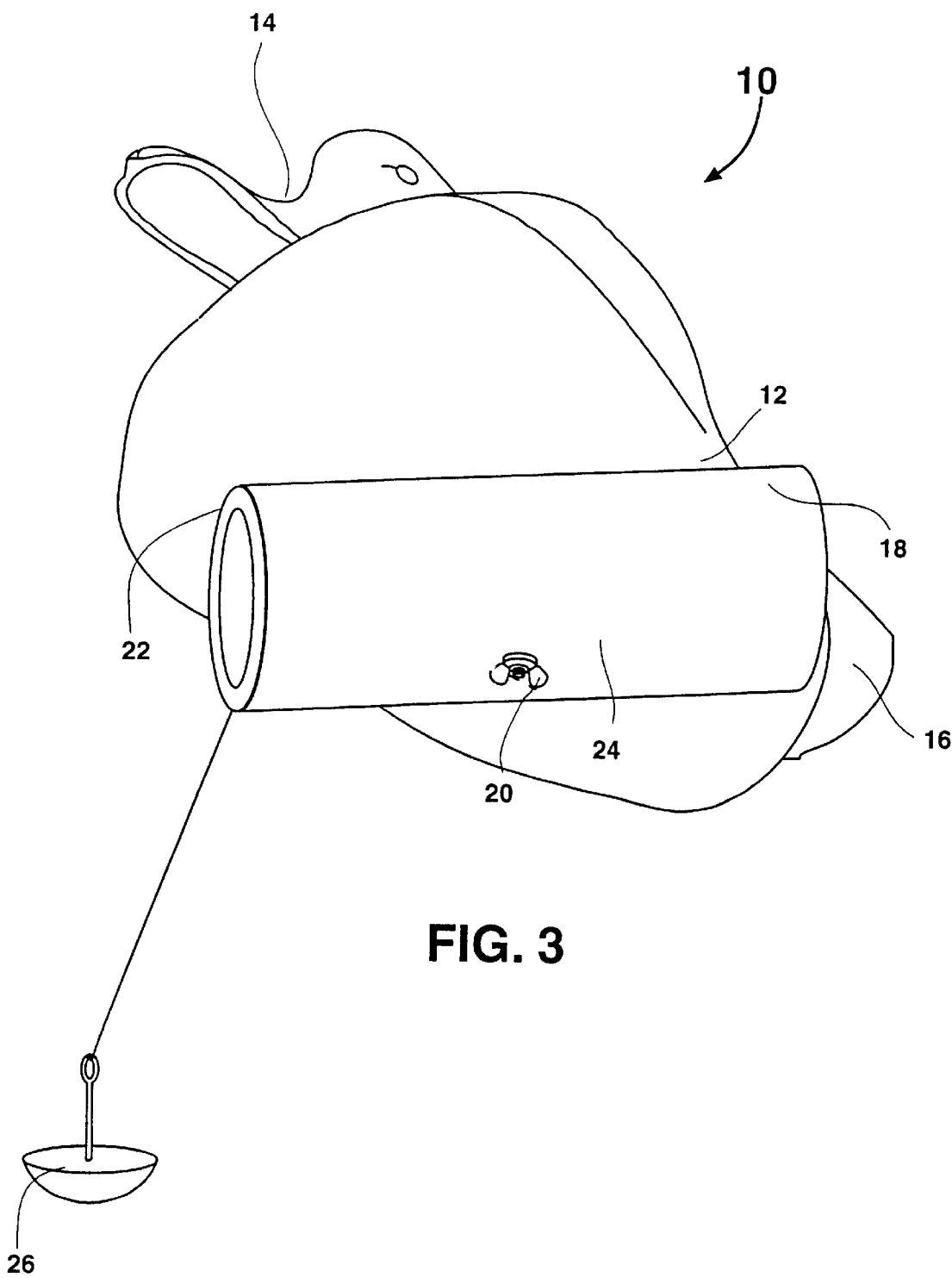
FIG. 3 is a perspective view of a first embodiment of the present invention

Referring now to FIG. 3, a perspective view of a preferred first embodiment of the present invention is shown. The invention comprises a decoy 10 having an upper portion 12 designed to have the appearance of a form of waterfowl. The upper portion 12 having a head 14 and a tail 16, and other features desired to enable the decoy to have the presentation of the type of waterfowl that is desired. The upper portion 12 is connected to a keel 18 through an attachment means 20. This keel 18 is placed in a desired orientation with regard to the axis of the head 14 and tail 16 of the decoy. The keel 18 may be fixed in a desired orientation or may be adjustably connected so as to obtain a desired orientation.

In this embodiment, the keel 18 has a first end 22 and extends to a second end 24 along a longitudinal axis. In this embodiment the keel 18 is a piece of rigid non-metallic conduit roughly one inch in diameter. However any material or shape, solid or hollow, may be used as long as it achieves the function of serving as a keel.

The keel 18 is connected to the upper portion 12 through an attachment means 20. This attachment means 20 may be a permanent or adjustable attachment means. The attachment means 20 may be a separate structure connected to said upper body 12 or may be formed as a part of the upper body 12 or the keel 18 through a manufacturing process such as molding. In this embodiment, the attachment means is an adjustable bolt and a wing nut combination connected through a hole near a central location of both the upper portion 12 and the keel 18. This means of attachment 20 is adjustable and is positioned so as to allow desired pivoting of the keel 18 and the upper portion 12 about the means of attachment 20. While in this embodiment the means of attachment is a bolt and nut combination, other means of attachment 20 may also be used so as to achieve and adjustable pivoting connection between the keel 18 and the upper portion of the decoy 12. Examples of specific forms of means of attachment which may be used include but are not limited to, a ratchet housing and pawl, adjustable pins, which insert into the decoy at various positions, adjustable clamps which releasably hold the decoy at various positions, or other known devices which allow for adjustable rotation about an axis. The location of the means of attachment 20 may be at any position on the decoy 10 according to the desires of the user.

An anchor 26 is connected to a portion of the decoy 10 and maintains the decoy 10 in a desired general location. In a preferred embodiment, the anchor 26 is set in the water in such a way that the decoy grabs the ground below the surface of the water. While the anchor 26 shown in this embodiment is of a particular shape, it is to be understood that any anchoring means that maintains the decoys in a generalized location maybe used.

In use, the decoy 10 is placed in water. The shape and materials of the decoy 10 allow the decoy 10 to float. The keel 18 is positioned in such a way that the keel 18 is oriented parallel within the direction of the current and non-parallel to the axis of the upper portion of the decoy defined by the head 14 and tail 16. The upper portion 12 of the decoy 10 is adjusted to a desired position, which may be parallel or non-parallelly oriented with regard to the keel 18 and the direction of the current. In some embodiments, the orientation of the keel 18 is fixed in a non-parallel orientation with regard to the upper portion 12. While in other embodiments the direction of the keel 18 and the upper portion 12 is adjustable.

Figure 4:
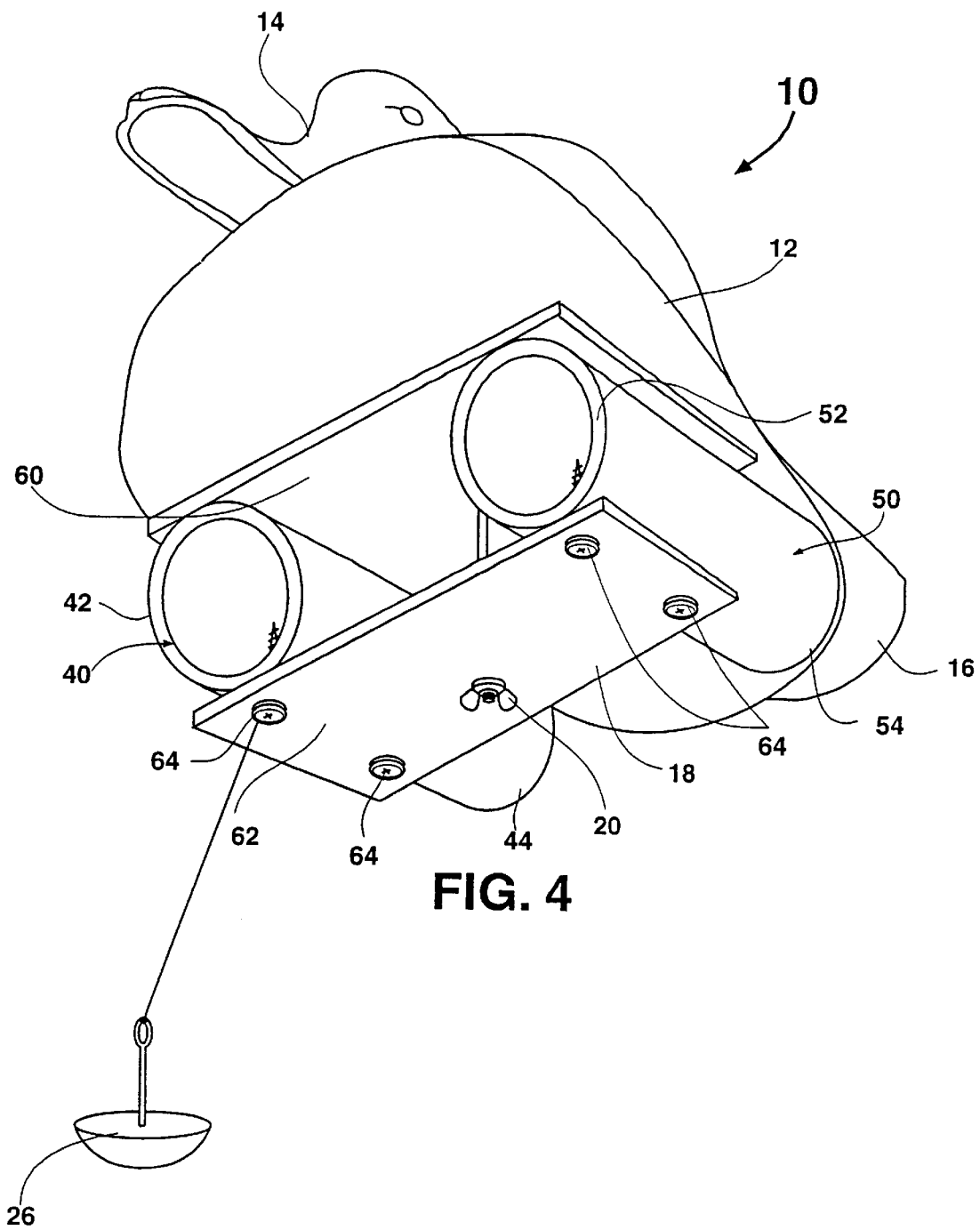
FIG. 4 is a perspective view of a second embodiment of the present invention.

Referring now to FIG. 4, a second embodiment of the invention is shown. In this embodiment, keel 18 is a double keel connected by a means of attachment 20 to upper portion 12 of the decoy 10. The double keel is comprised of a first keel 40 connected to a second keel 50 through a first plate 60 and a second plate 62. A means for connection 64 connects the keels 40, 50 to the plates 60, 62. In this embodiment, the keels 40, 50 are hollow tubing, the plates 60, 62 are lightweight metal sheets and the means for connection 64 are screws. However, it is to be understood that any configuration or materials which accomplish the desired objects can be utilized.

The heavier keel of the second embodiment provides several advantages in that a lower profile of a decoy in the water can be obtained because of the increased weight of the decoy. The heavier keel also provides additional stability in windy conditions or in heavy currents or weather. This allows a person placing the decoys to arrange the decoys in a more random, varied arrangement thereby increasing the appeal of the decoys to the flying waterfowl and presents a more random, natural appearance which is more effective at luring waterfowl.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A floating decoy for use in waterfowl, said decoy comprising:

an upper portion having a first end shaped like a head and extending along an axis to a second end shaped like a tail;

a hollow keel connected to said upper portion, said hollow keel having a generally tubular shape, said hollow keel having an open first end extending to an open second end along a longitudinal axis, said hollow keel configured to align along said longitudinal axis within a body of water and to allow passage of water from said open first end to said open second end along and through said hollow keel;

a connection device configured to connect said hollow keel to said upper portion; and an anchor connected to said hollow keel;

wherein said longitudinal axis of said hollow keel and said axis of said upper portion exist in generally parallel horizontal planes, and said longitudinal axis of said hollow keel is oriented diverpent to the axis of the upper portion, said hollow keel positioned and held in a desired orientation relative to said upper portion by said connection device;

whereby when said decoy is placed within a body of water, said hollow keel aligns within a current and said upper portion is maintained in a desired orientation within said body of water when said decoy is acted upon by a wind or water current.

2. A floating decoy for use in attracting waterfowl, said decoy comprising:

an upper portion having a first end shaped like a head and extending along an axis to a second end shaped like a tail;

a keel adjustable pivotally connected to said upper portion by a bolt and wing nut combination, said bolt and wing nut combination configured to adjustably orient said keel to any one of a plurality of desired positions and to hold said keel within said desired positions, said keel having a first end and extending to a second end along a longitudinal axis, said keel configured to align along said longitudinal axis within a body of water, and an anchor connected to said keel; wherein said longitudinal axis of said keel and said axis of said upper portion exist in generally parallel horizontal planes, and said longitudinal axis of said keel is oriented divergent to the axis of said upper portion, said keel positioned and held in a desired orientation relative to said upper portion by said bolt and wing nut combination;

whereby when said decoy is placed within a body of water, said keel aligns within a current and said upper portion is maintained in a desired orientation within said body of water when said decoy is acted upon by a wind or water current.

3. A floating decoy for attracting waterfowl comprising:

an upper portion having a first end shaped to resemble a head and extending along an axis to a second end shaped to resemble a tail;

a generally tubular shaped hollow keel having an axis extending from an open first end to an open second end along a passageway defined by said keel, said keel configured to allow passage of water from said first end to said second end along said keel, said keel adjustably pivotally connected to said upper portion by a bolt connected to a wing nut through a hole within said upper body; said bolt and wing nut configured to allow adjustable pivoting movement of said keel and to hold said keel in a desired generally horizontal orientation with regard to said upper portion; and an anchor connected to said keel;

wherein when said decoy is placed in a body of water, said anchor is fixed so as to maintain said decoy in a desired location, said axis of said keel is oriented parallel to a direction of a current and held in place by tightening said nut and bolt, said axis of said upper body adjustably oriented so as to obtain a desired orientation with regard to said axis of said keel;

whereby when impacted by a current, said keel aligns with a direction of said current and said upper portion maintains a desired orientation with regard to said current.

* * * * *